Apr. 10, 1923.

J. D. CUNNINGHAM

VEHICLE TIRE

Filed July 7, 1922

1,451,327

Inventor
J. D. Cunningham

By

Attorney

Patented Apr. 10, 1923.

1,451,327

UNITED STATES PATENT OFFICE.

JOHN DARIUS CUNNINGHAM, OF HOUSTON, TEXAS.

VEHICLE TIRE.

Application filed July 7, 1922. Serial No. 573,329.

*To all whom it may concern:*

Be it known that I, JOHN DARIUS CUNNINGHAM, a citizen of the United States of America, residing at Houston, in the county of Harris and State of Texas, have invented certain new and useful Improvements in Vehicle Tires, of which the following is a specification.

This invention relates to vehicle tires and is particularly directed to a combined cushion and pneumatic tire, in which the parts are so relatively disposed as to provide a substantial elimination of shock transmissions through the tire, while at the same time providing all necessary resiliency under a comparatively low pneumatic pressure.

The tire includes a solid rubber or cushion tread portion, the walls of the tire being made of fabric sections which are shaped in their upper portions to provide a distinct recess circumferentially of the tire in which the solid cushion portion is held. Inwardly of the fabric walls and at points to resist or cushion side shocks, there is provided a section of cushion rubber. The parts of the casing proper are so assembled and associated that the interior opening for the reception of the tube has a maximum dimension transverse the tire and a minimum dimension radially of the tire. This provides the maximum pneumatic resistance in the longitudinal center of the tire proper, the outer surface of the normal form inner tube being arcuate to graduate and distribute shocks throughout the full outer area and thus minimize their effect upon the tire parts when the tire is in use.

Figure 2:
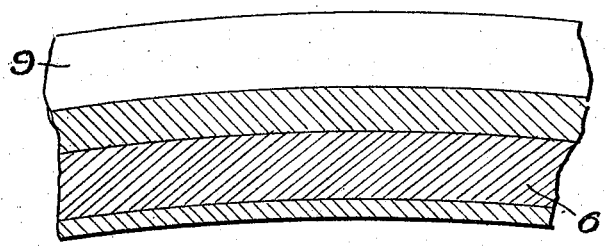
Fig. 2 is a section on line 2—2 of Fig. 1.
Figure 1:
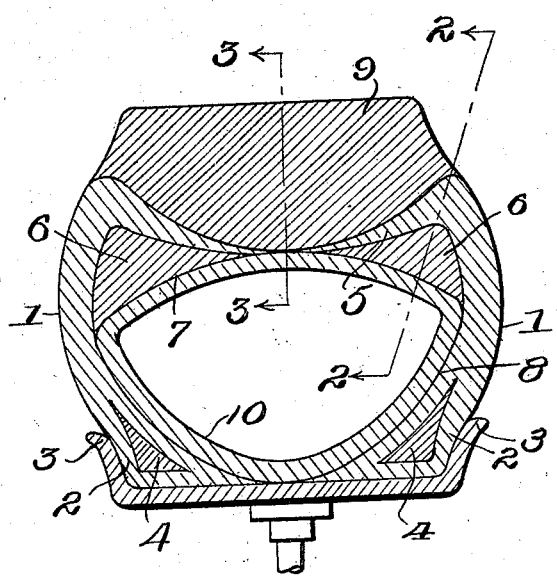
Fig. 1 is a vertical sectional view through a tire constructed in accordance with the present invention, the same being shown in positioning the rim.
Figure 3:
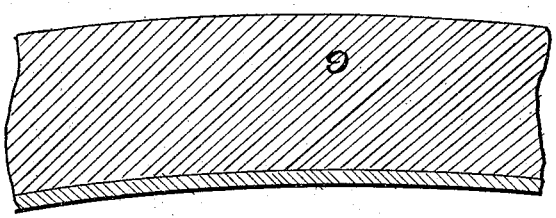
Fig. 3 is a section on line 3—3 of Fig. 1.

The improved tire comprises fabric wall portions 1 which at their lower edges are appropriately formed at 2 in any usual or preferred manner for cooperation with the usual metallic rim 3, the side walls being, if desired, arranged to provide for the usual anchoring elements 4. The side walls 1 which may and preferably are constructed of fabric layers in a manner well known to the trade, extend for a considerable portion of the normal height of the tire and are then deflected inwardly and of gradually decreased thickness, providing what may be termed an outer fabric section 5 for the tire, which is concaved and of decreasing thickness from the side walls to the center line of the tire. At the juncture of each side wall proper with the outer fabric wall 5 there is arranged a section 6 extending circumferentially of the tire. This section 6 is preferably of comparatively soft cushion rubber. The relatively inner or free surfaces of the cushions 6 define with the inner portion of the outer fabric wall 5 between the inner ends of said cushions, a convex or arcuate shaped plane 7 which defines the upper surface of the interior or tube receiving space in the tire. The lower section 8 of this space is defined by the inner surfaces of the side walls 1. Thus, the tube receiving space has a broad arcuate outer wall of convex form and a deeply concave inner or side wall which abruptly meets the outer wall, with the result that such space has a maximum dimension transverse the tire, and a minimum dimension radially of the tire.

A tread section 9 of cushion rubber or similar material is positioned in the concave recess formed by the outer surface of the fabric wall 5. The tread surface of the cushion 9 may of course be of any appropriate non-skid or smooth form, as this is immaterial so far as the present invention is concerned. The side edges of the tread 9 merge into the outer surfaces of the fabric walls 1, so that the tread 9 is thus held in a depression circumferentially of the tire, which depression has its maximum depth to thereby provide a maximum thickness of such tread as in the central line of the tire. At this central line, the fabric wall 5 is of minimum thickness so that at this point the pneumatic effect of the tube 10 which is arranged within the tire casing, has its maximum effect. Furthermore, while the shocks to which the tire is subjected are, by this construction, largely confined or initially directed to the center of the tire, it is apparent that such shocks incident to the soft cushion sections 6 and the shape of the fabric walls 1 and 5 are graduated over the extended convex outer wall of the pneumatic tube when the latter is in position.

The cushion elements indicated in the fillers 6 and tread 9 are so substantially reinforced by the fabric walls 1 and 5 that the movements of such cushions are taken up and compensated for by the greater resistance of such fabric walls.

It is understood of course that the parts of the tire casing described are following their assemblage in the form referred to, to be properly vulcanized into a complete whole in any well known or usual manner.

Claims:

1. A tire casing, having side walls of fabric and an upper concave wall of fabric, a cushion tread portion secured on said upper concave wall, and interior cushions substantially triangular in cross section secured to the inner surface of the side walls and the inner surface of the upper concave wall, the inner surface of the cushions and the fabric walls defining a tube receiving space.

2. A tire casing including fabric side walls, fabric outer walls integral with the side wall concave from the side walls toward the center and of tapering thickness, being thinner at the center than at the sides of the tire, a cushion tread secured on the concave outer wall, and cushion sections within the fabric portion at the juncture of the outer and side walls, whereby pressure on the tread section will be directed on the center portion of the tire so that a minimum spreading action will be exerted on the side walls.

3. A tire casing including fabric side walls, a fabric outer wall integral with the side walls and concave from the side walls towards the center of the tire, a cushion tread secured on said concave outer wall, cushion sections arranged within the tire at the juncture of the fabric side walls and outer wall, said cushion sections defining the upper surface of the tube receiving space.

4. A combined pneumatic and cushion tire including fabric side walls, a fabric outer wall integral with the side walls and concave from the side walls towards the center of the tire, a cushion tread secured on said concave outer wall, cushion sections arranged within the tire at the juncture of the fabric side walls and outer wall, said cushion sections defining the upper surface of the tube receiving space, and a tube fitted within the tube receiving space and bearing in part on the fabric side walls and in part on said cushion sections.

In testimony whereof I affix my signature.

JOHN DARIUS CUNNINGHAM. [L. S.]